United States Patent
Ma et al.

(10) Patent No.: US 9,162,312 B2
(45) Date of Patent: Oct. 20, 2015

(54) HIGH CONDUCTIVE DRIVE ROLL ASSEMBLY FOR PUSH-PULL MIG TORCH

(75) Inventors: Tiejun Ma, Tecumseh (CA); Romeo N. Cossette, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 263 days.

(21) Appl. No.: 13/607,862

(22) Filed: Sep. 10, 2012

(65) Prior Publication Data

US 2014/0069907 A1  Mar. 13, 2014

(51) Int. Cl.
  *B23K 9/133*  (2006.01)
  *B23K 9/12*  (2006.01)

(52) U.S. Cl.
  CPC ............... *B23K 9/123* (2013.01); *B23K 9/1336* (2013.01)

(58) Field of Classification Search
  USPC .................. 219/137.2, 137.7, 137.44, 137.31
  See application file for complete search history.

(56) References Cited

U.S. PATENT DOCUMENTS

| | | | |
|---|---|---|---|
| 3,789,186 A | 1/1974 | Rygiol | |
| 4,422,918 A * | 12/1983 | Inoue | 204/206 |
| 4,733,038 A | 3/1988 | Girardin | |
| 5,521,355 A * | 5/1996 | Lorentzen | 219/137.7 |
| 2006/0278624 A1* | 12/2006 | Christopher et al. | 219/137.7 |
| 2010/0096375 A1* | 4/2010 | Daniel | 219/137.31 |

FOREIGN PATENT DOCUMENTS

FR  561234  10/1923

\* cited by examiner

*Primary Examiner* — Brian Jennison
(74) *Attorney, Agent, or Firm* — Fildes & Outland, P.C.

(57) ABSTRACT

A drive roll assembly is disclosed for a push-pull MIG welding torch including a handle connected to a power cable assembly at one end, and a gooseneck-contact tip assembly at the other end. The drive roll assembly includes a body block disposed in the handle, a motorized driving gear mounted on the body block, and an idler wheel rotatably mounted on a mounting arm via a mount. The mounting arm is pivotally connected to the body block. The idler wheel is cooperable with the driving gear to pull welding wire from the cable assembly through the handle and towards the gooseneck. One of the idler wheel and the driving gear is made of a highly conductive material that allows for transfer of welding current to the welding wire, providing a secondary current transfer channel in addition to the conductive contact tip. The electric resistance from the body block to the surfaces of the idler wheel and driving gear at which they contact welding wire is below 15 milli-ohms, preferably below 2.0 milli-ohms.

18 Claims, 5 Drawing Sheets

HIGH CONDUCTIVE DRIVE ROLL ASSEMBLY FOR PUSH-PULL MIG TORCH

TECHNICAL FIELD

This invention relates to push-pull MIG welding torches, and more particularly to a drive roll assembly for a push-pull welding torch.

BACKGROUND OF THE INVENTION

It is known in the art relating to push-pull MIG welding torches that the transferring of welding current from the MIG torch to aluminum welding wire is hindered by the oxide layer on the surface of the welding wire. Insufficient or impeded energy transfer may cause drastic arc fluctuations and corresponding welding defects such as improper penetration, leg contours, high spatter, and burn back of the contact tip.

Two known methods exist for improving the conductivity from the MIG torch to the welding wire. The first method is to enhance the contact between the contact tip and the welding wire by, for example, using a spring loaded mechanism. The second method is to apply a secondary current transfer point, i.e. a second current pickup point, while still maintaining the primary current transfer through the contact tip. For example, a bronze jump liner may be used inside the copper gooseneck, a metallic wire guide may be used next to the pulling drive rolls, or the drive gear may be made live. However, these methods have corresponding drawbacks, such as increasing the feeding forces in the case of a metallic jump liner, causing shavings of the welding wire as the welding wire rubs the metallic wire guide, and arc erosion of the drive gear if the drive gear is made live.

Alternatively, the idler wheel in a push-pull MIG torch can be made live. However, all of the idler wheels in existing push-pull torches are made of high carbon steel or stainless steel and use ball bearings to resist mechanical wear and to obtain low rotating frictions. The electrical resistance from the power cable to the surface of the idler wheel in these torches is typically 2 to 40 ohms. This is hundreds of times the total electrical resistance of a typical push-pull MIG torch, which is 5 to 10 milli-ohms.

SUMMARY OF THE INVENTION

The present invention provides a high conductive drive roll assembly for a push-pull MIG welding torch. The present drive roll assembly has at least one drive roll (for example, the idler wheel) and its assembly components that are made of a high conductive material, thereby providing a secondary electrical pick-up point. The drive roll(s) may be made of a copper alloy, a copper-graphite composite, or similar, and its assembly components may be made of a copper alloy, a copper-graphite composite, an aluminum alloy, or steel with or without metallic coating. Further, the present drive roll assembly includes a copper based bushing rather than a steel ball bearing as in the prior art. Thus, the electrical resistance from the body block, which is a metallic hub inside the handle connecting the power cable and gooseneck, to the surface of the high conductive drive roll is below 15 milli-ohms, preferably below 2.0 milli-ohms.

More particularly, a drive roll assembly in accordance with the present invention for a push-pull MIG welding torch including a handle connected on one end to a power cable assembly and upstream of the power cable to a wire feeder and connected on an opposite end to a gooseneck and contact tip assembly, includes a body block disposed in the handle. A motorized driving gear is mounted on the body block. An idler wheel is rotatably mounted on a mounting arm via a mount, and the mounting arm is pivotally connected to the body block. The idler wheel is spaced from and peripherally adjacent the driving gear. The idler wheel is cooperable with the driving gear to pull welding wire from the power cable assembly through the handle and towards the gooseneck. One of the idler wheel and the driving gear is made of a highly conductive material that allows for transfer of welding current to the welding wire.

The highly conductive material may be one of a copper alloy and a copper-graphite composite. Likewise, the mount may be made of one of a copper alloy and a copper-graphite composite. Also, the mounting arm may be made of one of an aluminum alloy, a copper alloy, and steel coated with copper, nickel, or zinc. The mount may be one of a bushing and a shaft. The electric resistance from the body block to the surfaces of the idler wheel and driving gear at which the idler wheel and driving gear contact the welding wire is below 15 milli-ohms, preferably below 2.0 milli-ohms.

In another embodiment, a push-pull MIG welding torch in accordance with the present invention includes a handle connected on one end to a power cable assembly and upstream to a wire feeder and connected on an opposite end to a gooseneck and contact tip assembly. A body block is disposed in the handle. A pulling mechanism is mounted on the body block and includes a pair of spaced, peripherally adjacent drive rolls that are cooperable to pull welding wire from the power cable assembly through the handle and towards the gooseneck. The pair of drive rolls includes a motorized driving gear and an idler wheel that is urged towards the driving gear to engage the welding wire therebetween. The idler wheel is made of a highly conductive material. The idler wheel provides a secondary electrical contact point for transfer of electric current from a power source to the welding wire.

The highly conductive material may be one of a copper alloy and a copper-graphite composite. The driving gear also may be made of a highly conductive material, such as a copper alloy, a copper-graphite composite, and steel coated with copper, nickel, or zinc. The electric resistance from the body block to the surfaces of the drive rolls at which the drive rolls contact the welding wire is below 15 milli-ohms, preferably below 2.0 milli-ohms.

In another embodiment, a push-pull MIG welding torch includes a handle connected on one end to a power cable assembly and upstream a wire feeder and connected on an opposite end to a gooseneck and contact tip assembly. A body block is disposed in the handle. An insulated driving gear is mounted on the body block. An idler wheel that is made of a highly conductive material is freely rotatable on a mount. The mount is fixed to a mounting arm. A connector pivotally connects the mounting arm to the body block. The mounting arm and attached idler wheel are urged towards the driving gear such that the driving gear and the idler wheel are cooperable to pull welding wire from the power cable assembly through the handle towards the gooseneck. Electrical current from a welding power source travels on a conductive path that traverses the body block, the connector, the mounting arm, the mount, and the idler wheel to welding wire that is fed through the handle.

The idler wheel may be made of one of a copper alloy and a copper-graphite composite. The mount may be one of a bushing and a shaft. Also, the mount may be one of a single-piece construction or a multiple-piece construction. The mount may be made of one of a copper alloy and a copper-graphite composite. The mounting arm may be made of one of an aluminum alloy, a copper alloy, and steel coated with copper, nickel, or zinc. The connector may be a pin that is made of a copper alloy. The electrical resistance over the conductive path is below 15 milli-ohms, preferably below 2.0 milli-ohms.

In another embodiment, a push-pull MIG welding torch in accordance with the invention includes a handle connected on one end to a power cable assembly and upstream to a wire feeder and connected on an opposite end to a gooseneck and contact tip assembly. A body block is disposed in the handle. A pulling mechanism is mounted on the body block and includes a pair of spaced, peripherally adjacent drive rolls that are cooperable to pull welding wire from the power cable assembly through the handle and towards the gooseneck. The pair of drive rolls includes a motorized driving gear and an idler wheel mounted on a mounting arm. The idler wheel is urged towards the driving gear to engage the welding wire therebetween. The idler wheel is made of a highly conductive material. An electric shunt cable bridges the body block and the mounting arm. The idler wheel provides a secondary electrical contact point for transfer of electric current from a power source to the welding wire, and the electric resistance from the body block through the shunt cable to the surface of the idler wheel at which the idler wheel contacts the welding wire is below 15 milli-ohms.

These and other features and advantages of the invention will be more fully understood from the following detailed description of the invention taken together with the accompanying drawings.

DETAILED DESCRIPTION OF THE INVENTION

Figure 1:
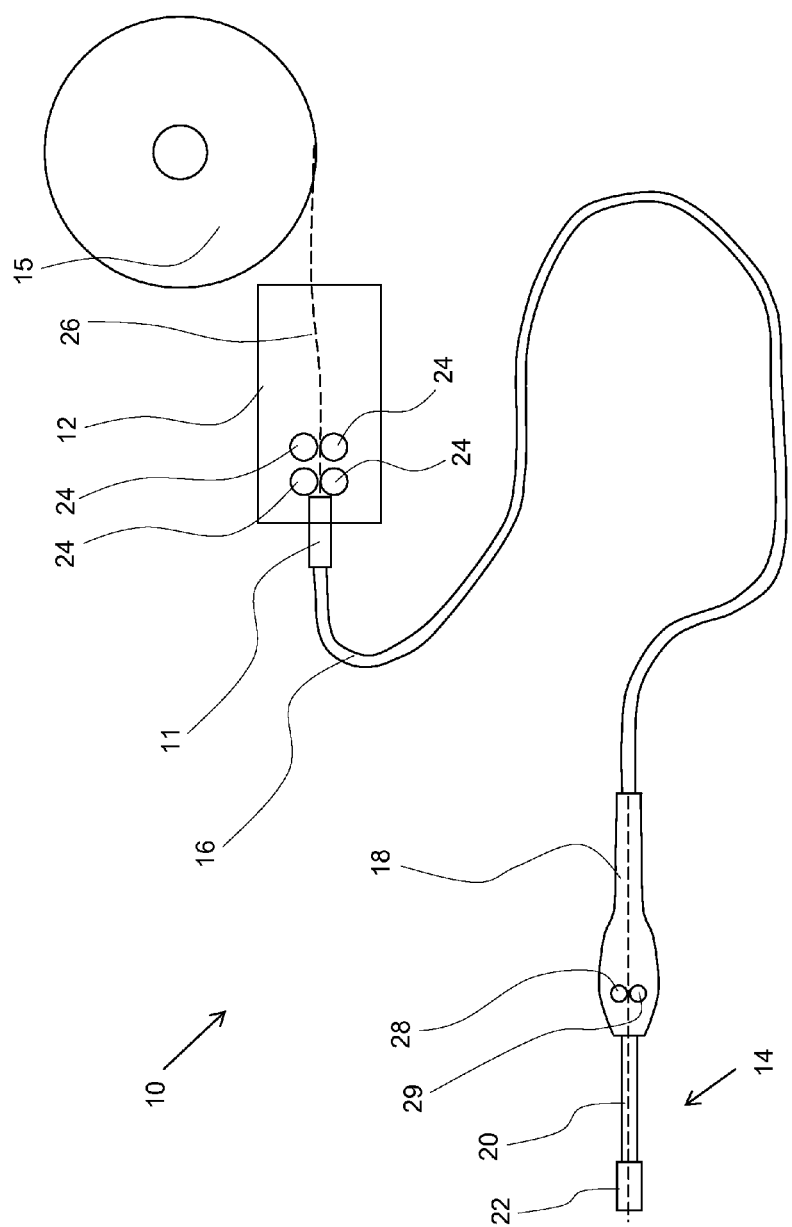
FIG. 1 is a schematic view of a push-pull welding system including a push-pull MIG welding torch in accordance with the present invention.

Referring now to FIG. 1 of the drawings in detail, numeral 10 generally indicates a push-pull welding system including a wire feeder 12 and a push-pull MIG welding torch 14. A power pin 11 is plugged into the wire feeder 12. A wire spool 15 or similar supplies consumable electrode (welding wire) to the wire feeder 12. A power cable assembly 16 is connected on an upstream end to the power pin 11 and on an opposite, downstream end to the push-pull MIG torch 14 to connect the torch to the wire feeder. The push-pull MIG torch 14 includes a handle 18 connected at a rear end to the power cable assembly 16 and at a front end to a gooseneck 20. A contact tip assembly 22 is attached to the gooseneck at a front end of the torch. Welding wire, together with welding current, shielding gas and/or coolant are transmitted through the push-pull MIG torch 14 and delivered to the welding arc formed at the outlet of the contact tip assembly 22.

The wire feeder 12 includes pushing drive rolls 24 that push the welding wire, which in the present embodiment is aluminum welding wire 26, through power cable assembly 16 to the handle 18 and front end of the torch 14. Due to the fact that aluminum welding wire is much softer than other welding wires (for instance, steel welding wire), the welding wire 26 cannot be fed through the long distance from the wire feeder 12 to the contact tip assembly 22 using only the pushing mechanism in the wire feeder. Therefore, a cooperating pair of pulling drive rolls 28, 29 inside the handle 18 pull the welding wire from the power cable assembly 16 through the handle 18 to the contact tip assembly 22 at the front end of the torch 14.

Figure 2:
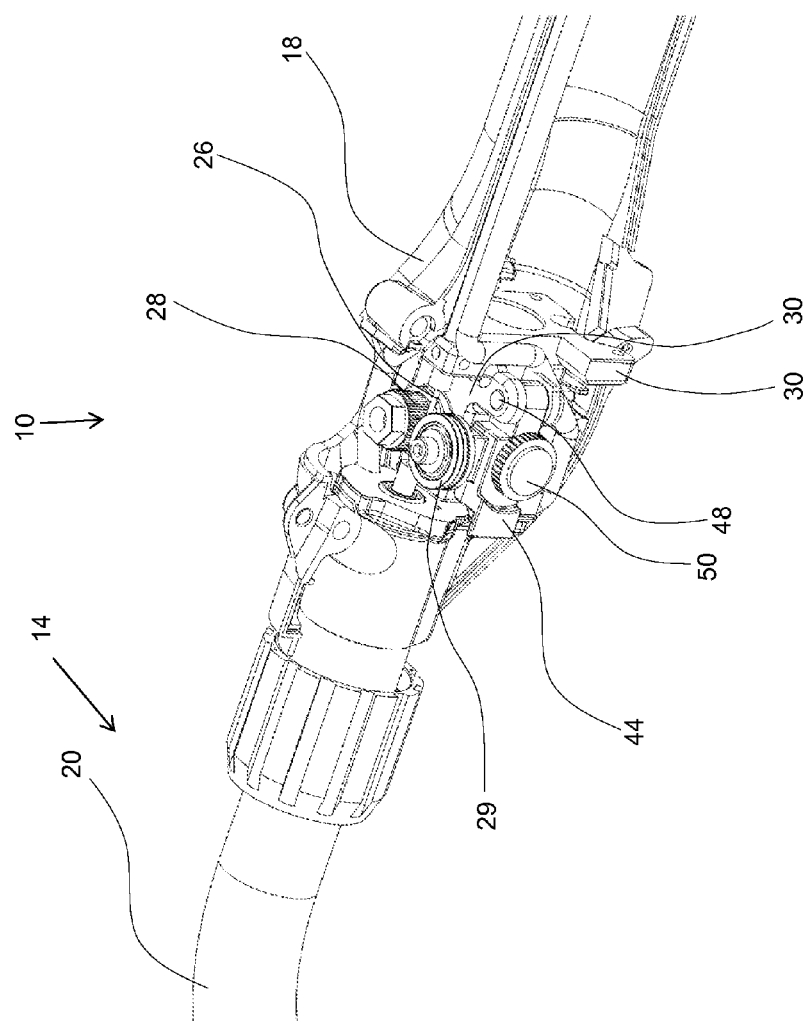
FIG. 2 is a perspective, cutaway view of a handle of the push-pull MIG welding torch including a drive roll assembly in accordance with the present invention.
Figure 3:
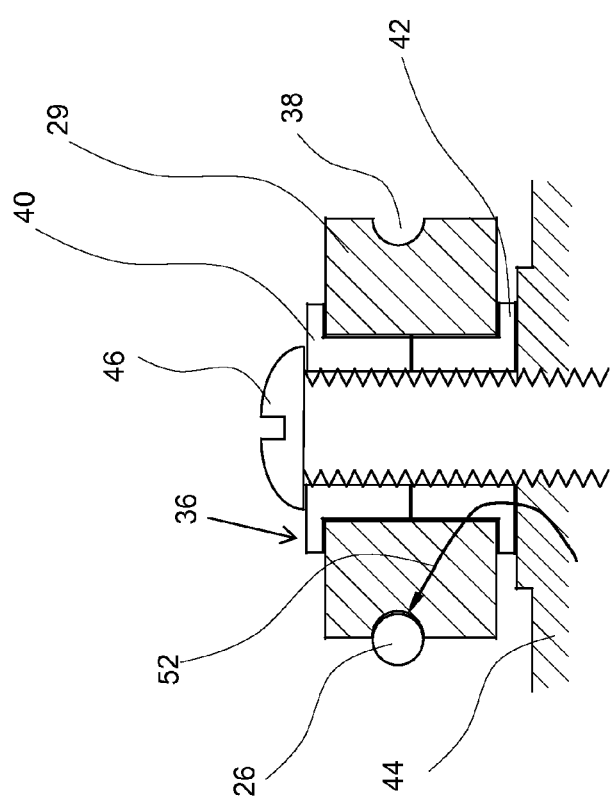
FIG. 3 is a schematic, sectional view of the drive roll assembly.

As shown in greater detail in FIGS. 2 and 3, the welding torch handle 18 includes a body block (torch body) 30 inside of the outer casing of the handle. The body block 30 is generally a metallic block that is typically made of an aluminum alloy or a copper alloy. The primary welding current is transferred from the power cable assembly through the body block, and downstream to the gooseneck, contact tip assembly, and eventually the welding wire. A pulling mechanism including the drive rolls 28, 29 is mounted on the body block 30. The drive roll 28 is defined by a motorized driving gear and the drive roll 29 is defined by a cooperable idler wheel. The driving gear 28 is mounted in a fixed position on the body block 30 and is powered for rotation by a motor (not shown). The idler wheel 29 is pivotally mounted on the body block 30 and is spaced from and peripherally adjacent the driving gear 28 in a use position wherein welding wire is feed between the drive rolls. More specifically, the idler wheel 29 is freely rotatable on a mount such as a generally cylindrical bushing 36, and includes an endless circular groove 38 on an outer side surface thereof for receiving and guiding welding wire. The bushing 36 may be of a multiple-piece construction including an upper flanged bushing portion 40 and a lower flanged bushing portion 42 that together retain the idler wheel 29 and provide a bearing surface for the idler wheel. The bushing 36 is fixed to a mounting arm 44 by a fastener 46 such as a bolt, screw, or similar. The mounting arm 44 is pivotally connected to the body block 30 by a connector 48 such as a pin or similar. A resilient member such as a spring or similar (not shown) disposed under cap 50 urges the mounting arm 44 (and attached idler wheel 29) inwardly towards the driving gear 28 so that welding wire 26 fed through the handle 18 is held between the driving gear 28 and the idler wheel 29, and within the groove 38 in the idler wheel. Operation of the driving gear pulls the welding wire forward into the front end of the torch 14. If it is necessary for the welding wire to retreat, the mounting arm 44 can be pivoted about the connector 48 to open the gap between the driving gear and the idler wheel.

The driving gear 28 and/or the idler wheel 29, as well as their mounting assemblies, may be made of a highly conductive material, such as a copper alloy, an aluminum alloy, or a copper-graphite composite. Preferably, the idler wheel 29 is made of the highly conductive material and the driving gear 28 is insulated to prevent the teeth of the driving gear from being damaged by arc erosion. However, it is acceptable for the driving gear to be alternatively made of the highly conductive material, and further both the driving gear and the idler wheel may be made of the highly conductive material. In the case that the idler wheel 29 is made of a highly conductive material, specific examples of the highly conductive material include C18200 copper, C316 bronze, SAE 841 bronze, copper-graphite composite, or other similar materials. Similarly, the bushing 36 may be made of a copper based material such as a copper alloy, SAE 841 bronze, copper-graphite composite, or similar. The mounting arm 44 may be made of an aluminum alloy, a copper alloy, steel or stainless steel preferably coated with copper, nickel, zinc, or similar. The connector 48 may be made of a copper alloy such as bronze or brass.

The present drive roll assembly provides a secondary electrical pick up point for transfer of welding current from the welding torch to the welding wire (the primary point being at the contact tip). The drive rolls provide ideal locations for conducting electrical current toward the welding wire because there is no relative movement between the drive rolls and the welding wire, so no sliding friction is introduced, shaving of the welding wire is minimal, and a spring-loaded contact always exists between the drive rolls and the welding wire that secures electrical contact between them. As arc erosion is eliminated, mechanical wear on a highly conductive drive roll is minimal because there is no relative movement between the drive roll and the welding wire.

Specifically, as shown in FIGS. 2 and 3, electrical current generated by a welding power source and transmitted through cable 16 to the handle 18 travels on a conductive path 52 that traverses the body block 30, the connector 48, the mounting arm 44, the bushing 36, and the idler wheel 29 to welding wire 26 that is fed through the handle. Due to the fact that the components along this channel are made out of highly conductive materials or coated with highly conductive materials, the electrical resistance (of the secondary pick up point) from the body block 30 to the surface (e.g., groove 38) of the idler wheel 29 is below 15 milli-ohms, preferably below 2.0 milli-ohms. In contrast, the typical electrical resistance of a ball bearing used in conjunction with a conventional idler wheel is from 2 to 40 ohms. In other words, conventional "live" drive rolls have over 1,000 to 20,000 times higher resistances than the present drive roll assembly. Thus, the present highly conductive drive roll mechanism (at 2 milli-ohms) provides a high efficiency secondary pick-up point that reduces occurrence of micro-arcs at the drive roll-electrode interface and reduces burn back of the contact tip. As a reference, the total electrical resistance (system resistance) of a typical push-pull torch that is 15 to 25 feet in total length is from 5 to 10 milli-ohms.

Figure 4:
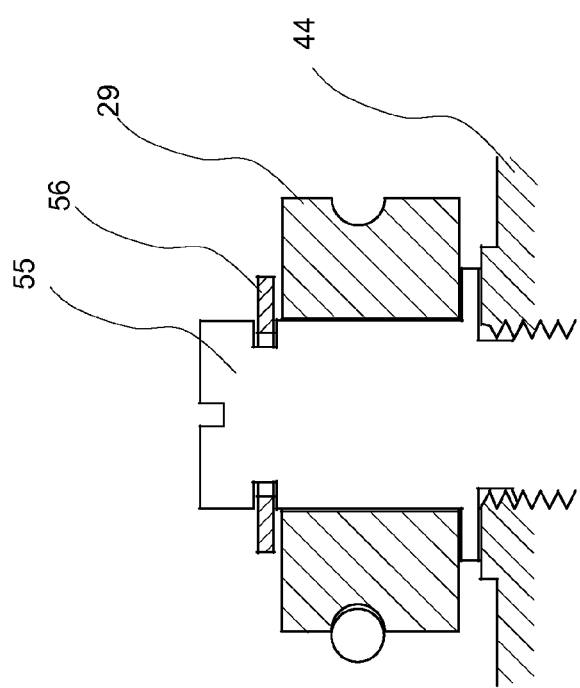
FIG. 4 is a schematic, sectional view of an alternative idler wheel assembly in accordance with the present invention.

In an alternative embodiment shown in FIG. 4, the mount is a highly conductive shaft 55 of single-piece construction (rather than the bushing 36). The shaft 55 is fixed to the mounting arm 44. A retaining ring 56, for example an e-clip or similar, prevents vertical (axial) movement of the highly conductive idler wheel 29. The idler wheel, however, can freely rotate over the shaft 55.

Figure 5:
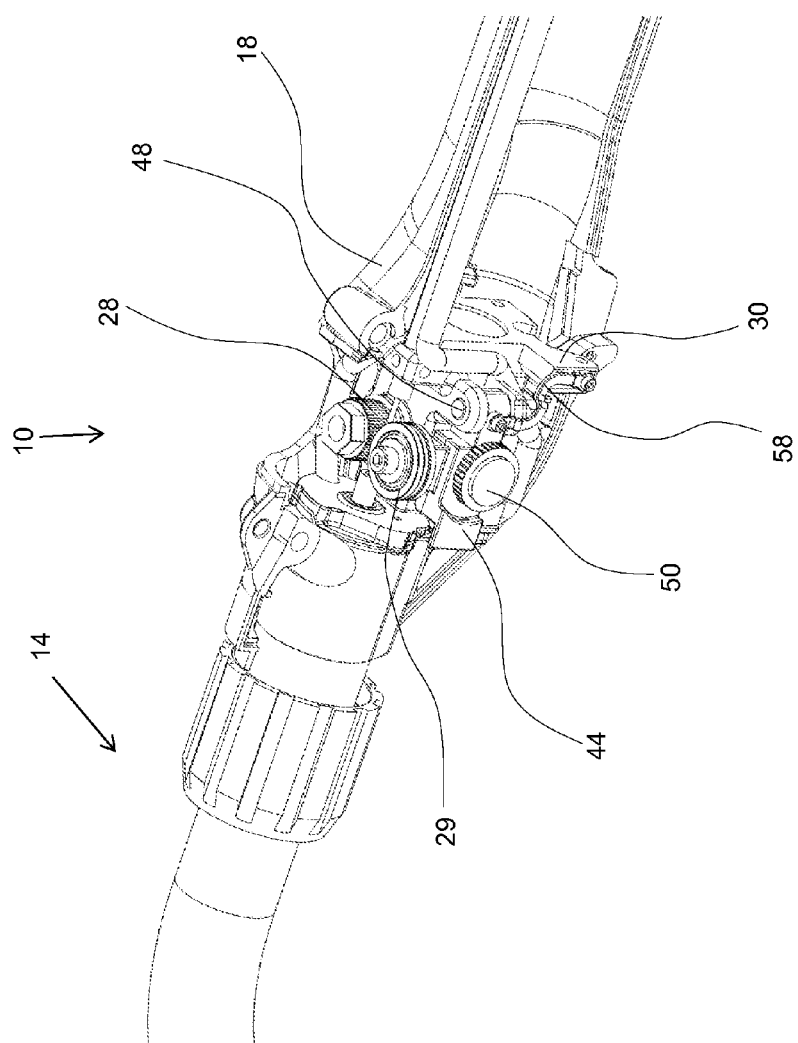
FIG. 5 is a perspective, cutaway view of a handle of the push-pull MIG welding torch including an alternative drive roll assembly in accordance with the present invention.

Turning to FIG. 5, another alternative is to use a shunt cable 58 to bridge the body block 30 or the power cable (not shown), to the mounting arm 44 (or the bushing or shaft of the highly conductive idler wheel 29). Thus, a conductive channel is provided to transfer the secondary welding current from the power cable through the shunt cable, mounting arm, bushing or shaft, to the idler wheel, and eventually to the welding wire. The electric resistance from the body block or power cable, to the surface of the idler wheel, where it contacts welding wire, is below 15 milli-ohms, preferably below 2.0 milli-ohms.

The present highly conductive drive roll does not replace the primary transfer of welding current, which is from the contact tip to the welding wire. The present highly conductive drive roll as a secondary pick-up point can be used in lieu of other mechanisms such as a bronze jump liner or a brass wire guide. Thus, the present invention eliminates unnecessary metal-to-welding-wire contact inside the push-pull torch. The welding wire is guided by plastic (such as PE, nylon, or PTFE) liners along the welding wire travel path except at the drive rolls and the contact tip. This significantly reduces shaving of the welding wire, improves feeding of the welding wire, and reduces burn back of the contact tip.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A drive roll assembly for a push-pull MIG welding torch including a handle connected on one end to a power cable assembly and upstream to a wire feeder and connected on an opposite end to a gooseneck and contact tip assembly, the drive roll assembly comprising:
   a body block disposed in the handle and connected to the power cable assembly;
   a motorized driving gear mounted on the body block, the driving gear being insulated from the body block; and
   an idler wheel rotatably mounted on a mounting arm via a mount, and the mounting arm being pivotally connected to the body block;
   the idler wheel being spaced from and peripherally adjacent the driving gear;
   the idler wheel being cooperable with the driving gear to pull welding wire from the power cable assembly through the handle and towards the gooseneck;
   the idler wheel being made of a highly conductive material that allows for transfer of welding current to the welding wire, wherein the contact tip assembly of said push-pull MIG welding torch provides a primary electrical contact point for transfer of electric current to said welding wire and said idler wheel simultaneously, provides an electrical contact point that is secondary to said contact tip assembly.

2. The drive roll assembly of claim 1, wherein the highly conductive material is one of a copper alloy and a copper-graphite composite.

3. The drive roll assembly of claim 1, wherein the mount is one of a bushing and a shaft.

4. The drive roll assembly of claim 1, wherein the mount is made of one of a copper alloy and a copper-graphite composite.

5. The drive roll assembly of claim 1, wherein the mounting arm is made of one of an aluminum alloy, a copper alloy, and steel coated with copper, nickel, or zinc.

6. The drive roll assembly of claim 1, wherein the electric resistance from the body block to the surface of the idler wheel at which the idler wheel contacts the welding wire is below 15 milli-ohms.

7. A push-pull MIG welding torch comprising:
   a handle connected on one end to a power cable assembly and upstream to a wire feeder and connected on an opposite end to a gooseneck and contact tip assembly;
   a body block disposed in the handle; and
   a pulling mechanism mounted on the body block and including a pair of spaced, peripherally adjacent drive rolls that are cooperable to pull welding wire from the power cable assembly through the handle and towards the gooseneck;
   the pair of drive rolls including a motorized driving gear and an idler wheel that is urged towards the driving gear to engage the welding wire therebetween;
   the idler wheel being made of a highly conductive material and electrically connected to the body block, and the driving gear being insulated from the body block;

wherein the contact tip assembly provides a primary electrical contact point for transfer of electric current from a power source to the welding wire, and the idler wheel simultaneously provides a secondary electrical contact point for transfer of electric current from the power source to the welding wire.

8. The push-pull MIG welding torch of claim 7, wherein the highly conductive material is one of a copper alloy and a copper-graphite composite.

9. The push-pull MIG welding torch of claim 7, wherein the electric resistance from the body block to the surface of the idler wheel at which the idler wheel contacts the welding wire is below 15 milli-ohms.

10. A push-pull MIG welding torch comprising:
   a handle connected on one end to a power cable assembly and upstream to a wire feeder and connected on an opposite end to a gooseneck and contact tip assembly;
   a body block disposed in the handle;
   an insulated driving gear mounted on the body block and insulated from the body block;
   an idler wheel that is made of a highly conductive material and electrically connected to the body block;
   a mount, the idler wheel being freely rotatable on the mount;
   a mounting arm to which the mount is fixed; and
   a connector that pivotally connects the mounting arm to the body block;
   the mount, the mounting arm, and the connector each being made of a highly conductive material;
   the mounting arm and attached idler wheel being urged towards said driving gear such that the driving gear and the idler wheel are cooperable to pull welding wire from the power cable assembly through the handle towards the gooseneck;
   wherein electrical current from a welding power source travels on a primary conductive path through the power cable assembly, the body block, the gooseneck, and the contact tip assembly to welding wire that is fed through the handle, and electrical current from the welding power source also simultaneously travels on a secondary conductive path that traverses the body block, the connector, the mounting arm, the mount, and the idler wheel to the welding wire.

11. The push-pull MIG welding torch of claim 10, wherein the idler wheel is made of one of a copper alloy and a copper-graphite composite.

12. The push-pull MIG welding torch of claim 10, wherein the mount is one of a bushing and a shaft.

13. The push-pull MIG welding torch of claim 10, wherein the mount is one of a single-piece construction or a multiple-piece construction.

14. The drive roll assembly of claim 10, wherein the mount is made of one of a copper alloy and a copper-graphite composite.

15. The drive roll assembly of claim 10, wherein the mounting arm is made of one of an aluminum alloy, a copper alloy, and steel coated with copper, nickel, or zinc.

16. The drive roll assembly of claim 10, wherein the connector is made of a copper alloy.

17. The drive roll assembly of claim 10, wherein the electrical resistance over the secondary conductive path is below 15 milli-ohms.

18. A push-pull MIG welding torch comprising:
   a handle connected on one end to a power cable assembly and upstream to a wire feeder and connected on an opposite end to a gooseneck and contact tip assembly;
   a body block disposed in the handle;
   a pulling mechanism mounted on the body block and including a pair of spaced, peripherally adjacent drive rolls that are cooperable to pull welding wire from the power cable assembly through the handle and towards the gooseneck;
   the pair of drive rolls including a motorized driving gear and an idler wheel mounted on a mounting arm, the idler wheel being urged towards the driving gear to engage the welding wire therebetween;
   the idler wheel being made of a highly conductive material and electrically connected to the mounting arm, and the driving gear being insulated from the body block; and
   an electric shunt cable that bridges the body block and the mounting arm;
   wherein the contact tip assembly provides a primary electrical contact point for transfer of electric current from a power source to the welding wire, the idler wheel simultaneously provides a secondary electrical contact point for transfer of electric current from the power source to the welding wire, and the electric resistance from the body block through the shunt cable and mounting arm to the surface of the idler wheel at which the idler wheel contacts the welding wire is below 15 milli-ohms.

\* \* \* \* \*